United States Patent [19]
Uragami et al.

[11] Patent Number: 6,149,709
[45] Date of Patent: Nov. 21, 2000

[54] METHOD OF MAKING IRON AND STEEL

[75] Inventors: Akira Uragami; Shuzo Ito; Koji Tokuda, all of Osaka, Japan

[73] Assignee: Kabushiki Kaisha Kobe Seiko Sho, Kobe, Japan

[21] Appl. No.: 09/026,683

[22] Filed: Feb. 20, 1998

[30] Foreign Application Priority Data

Sep. 1, 1997 [JP] Japan .................................. 9-236214

[51] Int. Cl.⁷ .......................... C22B 15/00; C21C 7/076
[52] U.S. Cl. ............................... 75/504; 75/569; 75/10.63
[58] Field of Search ................................ 75/10.61, 10.63, 75/10.46, 503, 560, 10.6, 504, 569

[56] References Cited

U.S. PATENT DOCUMENTS

| | | | |
|---|---|---|---|
| 4,021,232 | 5/1977 | Makino et al. | 75/10.61 |
| 4,179,278 | 12/1979 | Beggs et al. | 75/10.63 |
| 4,450,004 | 5/1984 | Matsuo et al. | 75/541 |
| 4,564,388 | 1/1986 | Vallomy | 75/504 |
| 4,661,150 | 4/1987 | Bates et al. | 75/10.65 |
| 4,701,214 | 10/1987 | Kaneko et al. | 75/481 |
| 5,417,740 | 5/1995 | Galperin et al. | 75/523 |
| 5,573,573 | 11/1996 | Berger et al. | 75/10.63 |
| 5,681,367 | 10/1997 | Hunter | 75/10.63 |
| 5,858,057 | 1/1999 | Celada-Gonzalez et al. | 75/490 |

OTHER PUBLICATIONS

Stephenson, Robert L. and Smailer, Ralph M., eds. Direct Reduced Iron: Technology and Economics of Production and Use. The Iron and Steel Society of AIME, Warrendale, PA. pp. 71, 72, 80,91, and 99, 1980.

Taiwanese Search Report w. 3p. English Language Summary Feb. 17, 2000.

*Primary Examiner*—Prince Willis
*Assistant Examiner*—Tima McGuthry-Banks
*Attorney, Agent, or Firm*—Oblon, Spivak, McClelland, Maier & Neustadt, P.C.

[57] ABSTRACT

Molten iron is prepared by (1) providing iron oxide and a carbonaceous reducing agent, (2) preparing a shaped product from the carbonaceous reducing agent and the iron oxide, (3) preparing solid reduced iron from the shaped product, wherein the solid reduced iron has a metallization of at least 60%, a specific gravity of at least 1.7, and a carbon content of at least 50% of the theoretical amount required for reducing the iron oxide remaining in the solid reduced iron, and, (4) before substantial cooling occurs, heating the solid reduced iron in an arc heating-type melting furnace at a high temperature. The molten iron can be prepared efficiently from iron ores of relatively low iron content without causing erosion of refractories, at high energy and high reduction efficiencies, and by a simple operation in a simple facility.

19 Claims, 10 Drawing Sheets

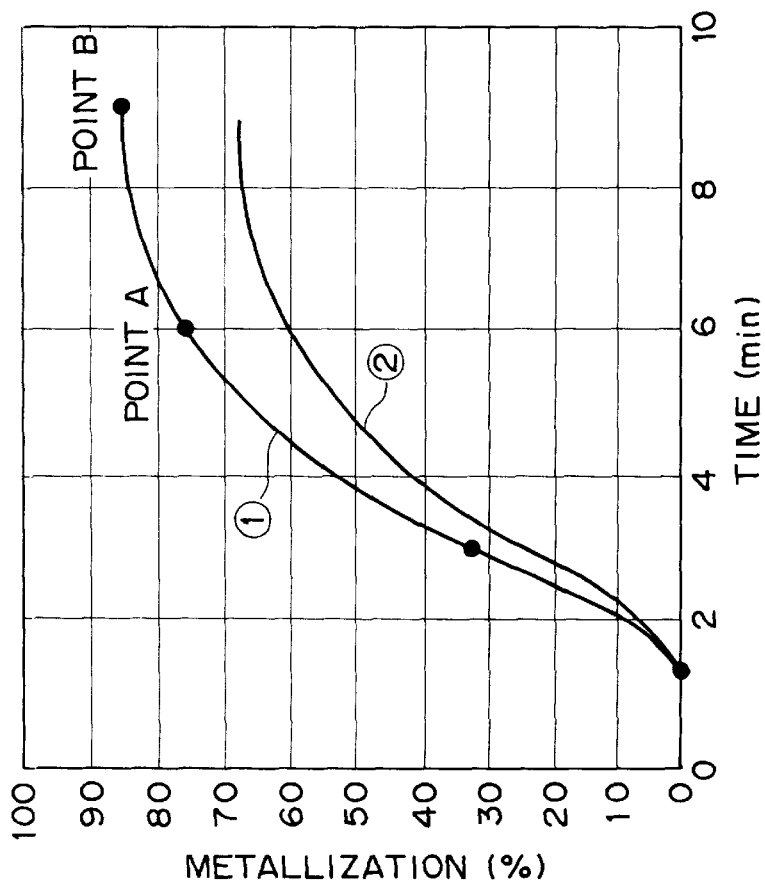

METHOD OF MAKING IRON AND STEEL

BACKGROUND OF THE INVENTION

1. Field of the Invention

The present invention concerns an improvement in an iron making method and a steel making method for producing metallic iron by heat-reducing iron oxides (such as iron ores) together with a carbonaceous reducing agent (such as carbon material). More particularly, the present invention relates to an improved iron making method and a steel making method, wherein molten iron is produced by heat-reducing iron oxide-containing shaped products incorporating a carbonaceous reducing agent (pellets or briquettes) in a solid state, and further reducing and melting them. These methods are capable of improving heat efficiency in a series of steps from heat-reduction to reduction melting, and are capable of efficiently conducting separation of gangue components.

2. Description of the Prior Art

As a direct reduction process for producing reduced iron by reduction of iron oxides such as iron ores or iron oxide pellets with a carbon material or a reducing gas, a shaft furnace method typically represented by a MIDREX process has been known. In the direct iron making process of this type, reduced iron is obtained by a process of blowing a reducing gas produced from a natural gas or the like through a tuyere in a lower portion of a shaft furnace, and reducing iron oxide by utilizing the reducing force of the reducing gas. Further, a reduced iron production process of using a carbon material such as coal as a reducing agent instead of a natural gas has been noted in recent years and, specifically, a so-called SL/RN method of heat reducing sintered pellets of iron ores together with fine coal in a rotary kiln already has been put to practical use.

Further, as another iron making method, U.S. Pat. No. 3,443,931 discloses a process for producing reduced iron, which comprises mixing a carbon material and iron oxide fine into lumps, and heat-reducing them on a rotary hearth. In this process, the fine ores and the fine coal are mixed into lumps and then heat-reduced under a high temperature atmosphere.

Reduced iron produced by the above-mentioned method is utilized as an iron source by inserting as it is or after being formed into a briquette configuration at an atmospheric temperature to an electric arc furnace. Since the reduced iron contains less impurity metal components such as tramp elements, the reduced iron has been noted as a diluting material for tramp elements contained in the scraps in recent years in which recycling for iron scraps has become more and more active.

However, since slag components such as $SiO_2$, $Al_2O_3$ and CaO contained as gangue components in iron oxides (iron ore, etc.), carbon materials (coal or the like) intrude, and the iron quality of products (purity as the metallic iron) is lowered. In practical use, although the slag components are separated and removed in the succeeding smelting step, increase in the amount of the slags lowers the yield of the smelted molten iron, as well as gives marked undesired effects on the operation cost of the electric arc furnace.

Reduced iron with high iron content and with less slag content has been demanded. However, for satisfying such a demand by the existent production process for reduced iron described above, iron ores with high iron content have to be used for the raw material for producing reduced iron, which greatly narrows the range of selection for the iron making materials which can be used practically.

Further, the prior art method described above finally intends to obtain a reduced solid product as an intermediate product, and requires steps such as briquetting, cooling, transportation and storage until the delivery of the product to the reduction melting step as the succeeding step upon practical use, during which a large energy loss is caused, or additional facility or energy is required for briquetting.

On the other hand, as a method of obtaining a preliminary reduced iron by direct reduction of iron oxides, a smelting reduction method such as a DIOS method has also been known. This method comprises preliminarily reducing iron oxides by 30–50% as pre-reduction ratio, then reducing them to metallic iron by direct reducing reaction with solid carbon and/or carbon monoxide in an iron bath and slag and then melting the same. However, since a recycle system of producing a reducing gas required for the preliminary reduction step in a smelting reduction vessel and introducing it into the preliminary reduction furnace is constituted in this method, it is troublesome and extremely difficult to attain a balance of the process. In addition, since liquid iron oxides (FeO) and refractories are brought into direct contact with each other in a molten state, a problem of large corrosion of the refractories has been pointed out.

Further, Japanese Patent Publication Hei 3-60883 discloses other methods of mixing fine ores and carbon material, shaping them into agglomerates, preliminarily reducing them by a rotary hearth type heating furnace, charging the thus obtained preliminarily reduced products without cooling into a melting furnace, melting them, preceding reduction with addition of the carbon material and further blowing oxygen to conduct smelting. Since the preliminary reduction products are sent without cooling to the melting furnace and put to reduction and smelting in this method, it is considered that this method gives less heat energy loss, enables continuous operation and is effective also in view of productivity.

In this iron making method, oxygen (or air) is blown together with a great amount of carbon material into the melting furnace for heating and smelting. Then, since gangue components in the iron ores and the carbon material are contained in a great amount as described above in the preliminary reduction products sent to the melting furnace, a great amount of slag are exposed to violent stirring of the molten iron in the melting furnace. Since a great amount of iron oxides (FeO) is intruded in the slag, this results in a severe practical problem of remarkably causing erosion of lined refractories, so that it is difficult to make the method practical in an industrial scale.

Anyway, in order to ensure a reducing gas having a sufficient reduction potential required in the preliminary reduction furnace at the upper stream in the melting furnace, since it is necessary to supplement a great amount of oxygen and carbon material (several hundreds kg/tmi (mi: molten iron to be manufactured)) into the melting furnace burning them, the thermal load on the melting furnace is extremely large and the lined refractories undergo severe erosion by violent stirring of the molten iron and the slag. Further, for stably supplying the reducing gas at appropriate composition and amount required in the preliminary reduction furnace, it is extremely troublesome for attaining the balance over the entire facility, and a high level control system is required.

SUMMARY OF THE INVENTION

The present invention has been accomplished in view of the foregoing situations. It is an object of the invention to provide an iron making method utilizing an iron oxide source of high iron content, or utilizing iron ores of relatively low iron content, without causing erosion of refractories. Moreover, this iron making method is capable of obtaining molten iron with simple facility and operation, and also provides a steel making method of using a molten iron obtained by the above-mentioned method.

An iron making method according to the present invention capable of overcoming the foregoing subject is an iron making method of obtaining a molten iron by supplying solid reduced iron, manufactured from iron oxide containing shaped products incorporating a carbonaceous reducing agent as the main material in a reduced iron production facility, at a high temperature with no substantial cooling to an arc heating type melting furnace, and heating the reducing iron in the melting furnace, wherein the method comprises preceding the metallization of the solid reduced iron to 60% or more, controlling the carbon content in the solid reduced iron to 50% or higher relative to a theoretical equivalent amount required for reducing the iron oxide remaining in the solid reduced iron, and the specific gravity of the solid reduced iron to 1.7 or greater, and heating the solid reduced iron by the arc heating type melting furnace to obtain a molten iron with the carbon content from 1.5 to 4.5%.

For practicing the present invention described above, in order to precede melting-reduction efficiently while minimizing the erosion of lined refractories of the arc heating type melting furnace, the solid reduced iron is discharged on a molten slag in the arc heating type melting furnace, the basicity of the molten slag is preferably controlled within a range from 1.0 to 1.8, and the iron oxide content in the molten slag is desirably restricted to 9% or lower and, further preferably, 5% or less being calculated as Fe.

When the carbonaceous reducing agent is additionally charged for compensating insufficiency in the arc heating type melting furnace, it is desirable to add the carbonaceous reducing agent to the charging position of the solid reduced iron, since this can proceed the reduction melting more efficiently.

Further, the amount of the carbonaceous reducing agent charged additionally in the arc heating type melting furnace is important for adjusting the carbon content in the molten iron obtained by melting reduction within the range from 1.5 to 4.5% specified in the present invention. For the method of controlling the amount of the carbonaceous reducing agent to be charged additionally, there are recommended:

1) a method of sampling the molten iron in the arc heating type melting furnace, directly analyzing the molten iron and controlling the addition amount of the carbonaceous reducing agent such that the carbon content is within the range described above, or 2) a method of measuring the composition and the amount of exhaust gases exhausted from the arc heating type melting furnace, determining the carbon content in the molten iron by calculation on the basis of the oxygen equivalent amount in the exhaust gas calculated from the measured value and controlling the addition amount of the carbonaceous reducing agent.

Further, the present invention has a major technical feature in controlling such that the carbon content in the molten iron is within the range described above and the molten iron comprising 0.05% or less of Si, 0.1% or less of Mn, 0.1% or less of P, and 0.20% or less of S can be obtained. The molten iron is desulfurized and dephosphorized by the method described below. The S content is reduced to about 0.050% or less, and the P content is reduced to about 0.040% or less, and a molten iron with less impurity content can be obtained, which is useful as the raw material for steel making in an electric arc furnace (hereinafter referred to as EAF) or a basic oxygen furnace (hereinafter referred to as BOF).

For the desulfurizing and/or dephosphorizing method adopted in this invention, the following method is preferably recommended: a method of transferring the molten iron produced in the arc heating type melting furnace to a separate vessel, desulfurizing the molten iron with addition of a calcareous desulfurizing flux (or injection together with a gas) and/or dephosphorizing by blowing a calcareous flux containing a solid oxygen source (iron oxide or the like) and gaseous oxide.

In the method of the present invention, the reduction potential upon reducing the iron oxide source such as iron ores is lower compared with that in the blast furnace iron making method, and $SiO_2$ in the gangue component is formed into slag as $SiO_2$ with no reduction. Accordingly, since the Si content in the obtained molten iron is low (0.05% or less), no particular desiliconization is required. In addition, since the Si content in the molten iron is low, molten iron with low P content can be obtained easily by the dephosphorization as described above with no requirement for preliminary desiliconization at all.

The molten iron with less impurity content thus obtained can be supplied in the molten state as it is to an EAF or a BOF disposed in adjacent therewith as the steel making material, thereby the system can be put to practical use as a continuous process for iron making and steel making, or the produced molten iron can be discharged once to the outside of the furnace, and the metallic iron cooled to solidification can be supplied as the steel making material to the EAF or the BOF. Particularly, by the use of a steel making method of supplying the molten iron at a high temperature with less impurity content produced by the above-mentioned method in the molten state as it is to the EAF or the BOF as the steel making material, since the heat energy possessed in the molten iron can be utilized effectively as a heat source for the refining, it is recommended as an extremely effective method also with an economical point of view.

BRIEF DESCRIPTION OF THE DRAWINGS

FIG. 3 is a graph illustrating an example of the relation between the reduction rate and the reduction time of a solid reduced iron obtained in the experiment;

DETAILED DESCRIPTION OF THE PREFERRED EMBODIMENTS

The entire constitution of the present invention will be described schematically by way of an entire flow chart illustrating a preferred embodiment, and reasons for defining conditions of every step will be explained specifically.

Figure 1:
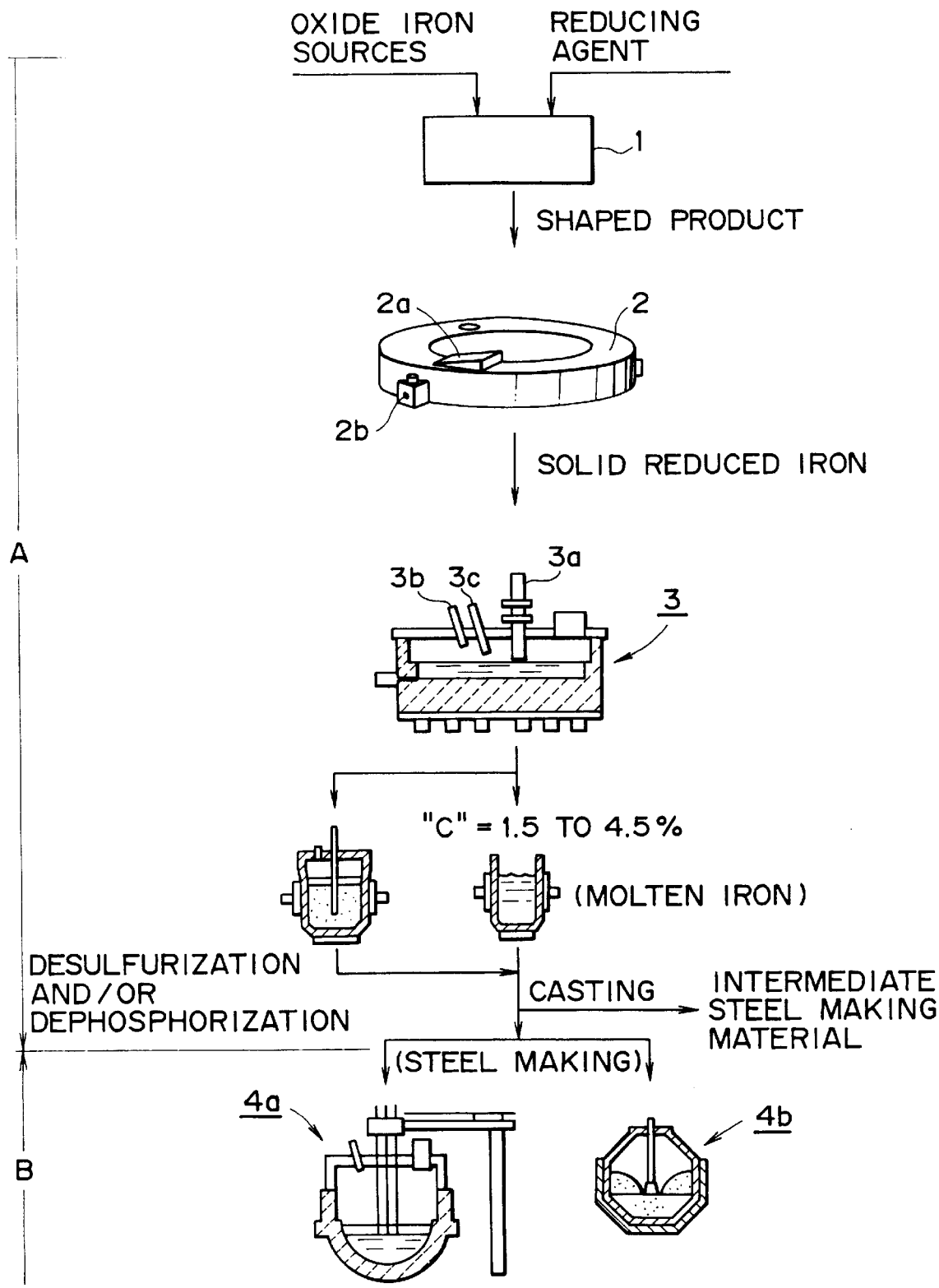
FIG. 1 illustrates a typical example of a continuous process of reduction of an iron oxide containing shaped product incorporated with carbon material, arc heating type melting, and steel making according to the present invention.

FIG. 1 is a schematic flow chart illustrating a continuous process for an iron making method and an iron making/steel making according to the present invention, in which is shown a material shaped product manufacturing section 1, a reduced iron production facility 2, an arc heating type melting furnace 3, and a steel making furnace 4 respectively. A series of steps shown by an arrow A correspond to a iron making (manufacturing of reduced iron) method, while the steps shown by an arrow B correspond to the steel making method.

At first, in the iron manufacturing method, iron oxide-containing shaped products incorporated with carbon material (pellet or briquette) are manufactured using an iron oxide source such as iron ores and the powder of a carbonaceous reducing agent such as fine coal, or fine coke as the raw material in the material shaped product manufacturing section 1, and the manufactured shaped products are successively sent to the reduced iron production facility 2. As the reduced iron production facility 2, any facility may be adopted so long as the facility has a function of heating the iron oxide containing shaped product incorporated with carbon material (hereinafter sometimes referred to as shaped product), and preceding the reduction of the iron oxide component in the shaped product by the reducing power of the incorporated carbon material and the reducing power of CO gas formed by combustion thereof while substantially keeping the solid state as it is. For example, a facility having any structure such as a rotary kiln or a rotary hearth type furnace may be used. The facility 2 is provided with a transportation means for the shaped products, as well as provided with a heating source such as a burner, a combustion oxygen supply section and, optionally, a reducing gas supply section and, further, incorporated with a thermometer or a temperature control means such that the preceding state of reduction can be controlled properly. FIG. 1 shows a rotary hearth type device having a constitution of heat-reducing the shaped products charged from the charging section 2a while moving them along with the movement of the rotary hearth and discharging the same in the solid state as they are from the successive discharge section 2b at an instance reaching a predetermined reduction ratio.

The solid reduced iron reduced in and discharged from the reduced iron production facility 2 is sent successively with no substantial cooling to the arc heating type melting furnace 3, in which heating-reduction of iron oxides remaining unreduced in the shaped products is preceded and the reduced iron is melted simultaneously. Since the solid reduced iron discharged from the reduced iron production facility 2 usually possesses a heat of about 700 to 1,300° C. and the heat is utilized substantially as it is as the heat source for the arc heating type melting furnace 3, it can contribute to the lowering of the energy consumption for arc heating.

The arc heating type melting furnace 3 used herein has a function of heating the molten iron without forced stirring by utilizing the heat of arcs, and efficiently preceding the reducing and melting while restricting the erosion of lined refractories as much as possible, and the arc includes submerge arc caused by inserting electrodes 3a into slag floating on the molten iron in the melting furnace 3 and supplying electric current. Then, a material (solid reduced iron) charging section 3b is disposed in the vicinity of the arc heating section (that is, at the portion of inserting the electrodes 3a) such that the solid reduced iron charged in the arc heating type melting furnace 3 is rapidly reduced and melted undergoing the heat of arcs. Further, the additionally charging section 3c for the carbonaceous reducing agent is disposed being opposed to the position for charging the solid reduced iron.

Then, in the arc heating type melting furnace 3, molten iron (sometimes also referred to as molten metal or molten iron) by reduction and melting of charged solid reduced iron A is formed, which is incorporated successively into the molten iron already formed and accumulated, and the gangue components present together in the solid reduced iron A are formed as molten slag and joined with the molten slags floating on the molten iron. Accordingly, at the instance the molten iron and molten slag are accumulated by predetermined amount in the arc heating type melting furnace 3, the molten iron can be discharged successively from a lower position at the side wall of the melting furnace 3 properly, or the molten slag may be discharged properly from a position somewhat above the boundary between the molten slag and the molten iron.

The molten iron thus obtained is sent, after the cleaning treatment such as desulfurization and dephosphorization as required, into the steel making furnace 4 as the steel making material. For the steel making furnace 4, an EAF 4a or a BOF 4b is used in which smelting is conducted in admixture with iron scraps or pig iron. In this case, if the steel making furnace 4 is arranged in adjacent with the arc heating type melting furnace 3, since the molten iron at a high temperature can be supplied with no substantial temperature lowering as the material for the steel making furnace 4 by which the heat possessed in the molten iron can be utilized as it is for the heat source of smelting, it is most preferred in view of the heat efficiency. Depending on the case, the molten iron obtained in the arc heating type melting furnace 3 can be once put into a casting mold or the like, cooled to solidify, and formulated into commercial goods as raw intermediate steel making material, or can be sent as the material for steel making to a steel making furnace at a remote location.

Since the molten iron obtained according to the present invention contains less amount of impurity metal components contained therein compared with scraps as described previously, it can be utilized effectively as a diluent for impurity metal components in the scraps by the combined use in a an appropriate amount with the scraps.

The fundamental step in the present invention are as described above and, for practicing such steps efficiently in an industrial scale, it is extremely important to control the metallization of the solid reduced iron, the carbon content in the solid reduced iron and the specific gravity of the solid reduced iron in the reduced iron production facility, as well as it is extremely important to properly control the carbon content in the molten iron produced by reduction melting in the arc heating type melting furnace 3. Description will be made specifically to them.

At first, when the iron oxide-containing shaped products to be supplied to the reduced iron production facility 2 are shaped, an iron oxide source such as iron ore and each of powder of carbonaceous reducing agents such as coal or coke as the shaping material and mixed optionally together with an appropriate amount of a binder, the mixed products are shaped into an optional configuration by using an optional pelleting device or a pelletizer, and they are put to preliminary sintering as required and used. For manufacturing the shaped products, it is desirable for efficiently preceding the reduction in the reduced iron production facility 2, to mix the carbonaceous reducing agent required for obtaining an aimed residual carbon amount together with the iron oxide source while considering the theoretical equivalent amount required for reducing the iron oxide and reducing reaction characteristics of the reduced iron production facility. For obtaining a solid reducing iron with "metallization of 60% or higher", which is important in performing a stable operation according to the method of the present invention, a carbon material required for obtaining previously determined aimed metallization is blended, and the atmospheric temperature and the reaction time in the reducing furnace may be controlled properly.

Then, in the present invention, it is an important factor of preceding metallization to 60% or higher for the solid reduced iron obtained in the preliminary reduction step in the reduced iron production facility 2. That is, for conducting the preliminary reduction by the reduced iron production facility 2 to the melting reduction by the arc heating type melting furnace 3 in the succeeding step as a continuous process stably and efficiently, it is essential to minimize the scattering of the metallization of the solid reduced iron supplied from the reduced iron production facility 2 to the arc heating type melting furnace 3. If the metallization varies greatly, it is difficult to control the operation conditions such as the carbonaceous reducing agent charged additionally in the melting furnace 3 and operation conditions such as heating condition and, thus, this makes rapid reduction melting for the solid reduced iron difficult but also this makes it difficult for the control of the carbon content in the molten iron.

That is, if the metallization of the solid reduced iron supplied to the arc heating type melting furnace 3 is 60% or less, a great amount of heat has to be supplemented in the melting furnace 3 for compensating the heat required for the reduction (endothermic reaction) of unreduced iron oxide remaining in the solid reduced iron. Specifically, a great amount of electric power has to be supplied to the electrode for arc heating, which remarkably increases the reduction load of the melting furnace, as well as the erosion of lined refractories in the melting furnace becomes largely to result in an extreme shortening for the life of the melting furnace 3 making it difficult to put to practical use in an industrial scale. By the way, if the metallization of the solid reduced iron is increased to 60% or higher, preferably, 70% or higher, no excess reduction load is caused in the arc heating type melting furnace 3, the foregoing problems can be avoided and smooth reduction melting can be conducted.

There is no particular restriction on the concrete means for increasing the metallization for the solid reduced iron obtained in the reduced iron production facility 2 to 60% or more, which may be attained by properly controlling the blending amount of the carbonaceous reducing agent upon manufacturing the shaped products (equivalent ratio relative to the iron oxide component) and the preliminary reduction condition in the reduced iron production facility 2, (temperature, reduction potential, processing time and the like). For the conditions, when the relation between the conditions and the metallization are previously examined in the preliminary experiment and they are applied to an actual operation, predetermined metallization can be ensured easily without causing remarkable scattering.

Further, it is important for the solid reduced iron supplied to the arc heating type melting furnace 3 to control the specific gravity of the solid reduced iron to 1.7 or greater, and make the carbon content in the solid reduced iron to 50% or greater relative to the theoretical equivalent amount required for reducing the iron oxide remaining in the solid reduced iron.

The reasons for defining the above-mentioned factors are as described below. That is, the solid reduced iron A to be charged into the arc heating type melting furnace 3 is charged, for example, as shown in FIG. 2 (schematic view), on the molten slag S already formed in the melting furnace 3 and floating on the molten metal. For rapidly preceding the reduction by efficiently heating the solid reduced iron A by the heat of arcs, it is necessary that the solid reduced iron A is submerged in the molten slag S and receives heat from all of the surfaces. Then, as a result of various experiments, it has been confirmed that the solid reduced iron A submerges rapidly into a molten slag and the reduction can be proceeded rapidly by making the specific gravity of the solid reduced iron A to 1.7 or greater, the carbon content in the solid reduced iron A is made 50% or higher relative to the required theoretical equivalent amount for reducing the iron oxide remained in the solid reduced iron A.

Specific gravity of the slag is generally about 2.4 to 2.7, and the reason why the solid reduced iron A having a specific gravity of about 1.8 submerges into the molten slag S is considered as below. Namely, the solid reduced iron A charged in the molten slag S in the melting furnace 3 receives heat from surface of the molten slag S and a predominant amount of CO gas and a smaller amount of $CO_2$ gas are released at the periphery of the solid reduced iron A by the reducing reaction caused by the carbonaceous reducing agent remaining at the inside, which are then mixed in the form of foams in the molten slag S to cause blowing (refer to FIG. 2(A)) and the specific gravity of the molten slag S is lowered. Then, as the solid reduced iron A further submerges into the molten slag S (FIG. 2(B)), the amount of the gas generated from the solid reduced iron A is increased furthermore, blowing becomes further violent since the amount of the gas released from the solid reduced iron A is further increased to make the blowing of the molten slag S more violent. The specific gravity is further lowered and the solid reduced iron A further sinks into the molten slag S, and receives heat from the molten slag S on the entire surface of the reduced iron A (FIG. 2(C)) at the instance after the solid reduced iron A entirely sinks into the slag, and the solid reduced iron A is rapidly reduced and melted. Then, the molten iron is successively taken into the molten iron Fe, and the by-produced slag components are successively taken into the molten slag S.

Figure 2A:
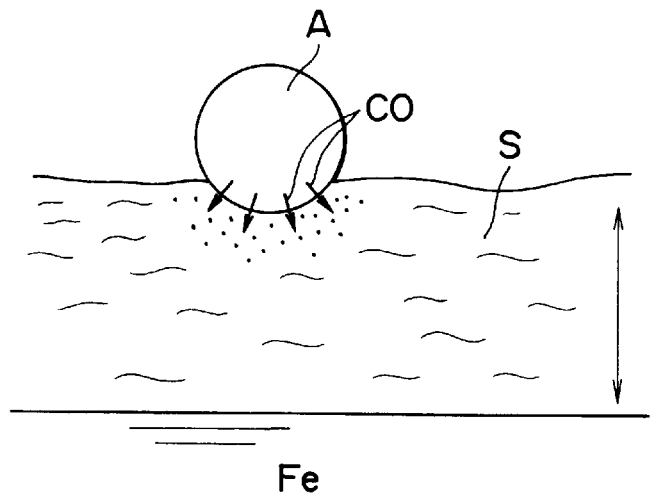
FIG. 2 explains the behavior of reduction melting of solid reduced iron charged on a molten slag in an arc heating type melting furnace.

In this case, if the specific gravity of the solid reduced iron is less than 1.7, the solid reduced iron A charged on the molten slag S in the arc heating time in the melting furnace 3 no more sinks in the molten slag S but floats as it is on the molten slag S, as shown in FIG. 2(A), by which the area of contact with the molten slag S is decreased to lower the heating efficiency and the reducing reaction rate is lowered to take a longer processing time. As a result, the productivity is lowered remarkably and it is difficult to put the process to practical use from industrial and economical points of view.

Figure 2B:
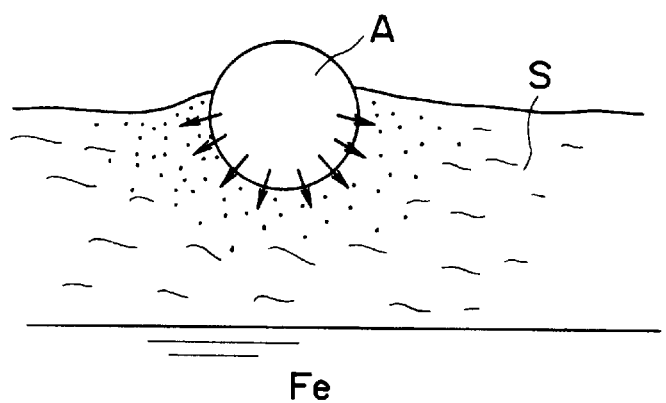
Figure 2C:
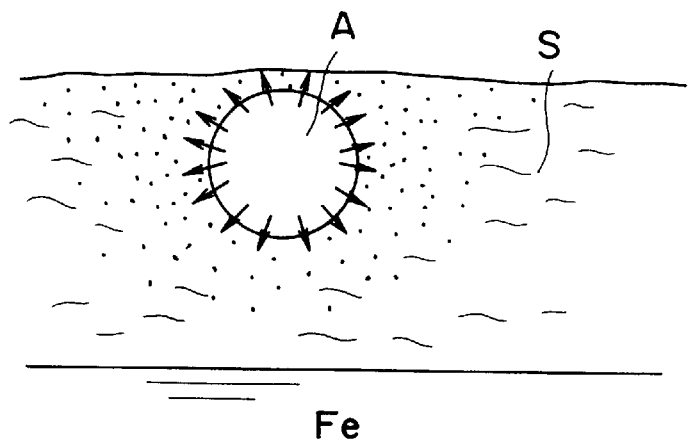

On the contrary, if the specific gravity of the solid reduced iron A is 1.7 or more, preferably 1.8 or higher, and further preferably 1.9 or higher, the solid reduced iron A charged on the molten slag S sinks into the molten slag S in an extremely short period of time due to the difference of the specific gravity as shown in FIGS. 2(B), (C), and receives heat of the molten slag S on the entirety of the surfaces and reduction proceeds rapidly, so that the reduction efficiency is improved remarkably to rapidly complete the reducing reaction. Meanwhile, the amount of the iron oxide melted into the molten slag S is also minimized and the erosion of the lined refractories also can be minimized.

For the reduction efficiency of the solid reduced iron A, the heat conduction efficiency of the heat of arcs transmitted by way of the molten slag S as described above is extremely important. Even if the specific gravity is appropriate, if the amount of the carbonaceous reducing agent contained in the solid reduced iron A is insufficient, no satisfactory reduction efficiency can be obtained. In the melting furnace 3, it is also possible to additionally charge the carbonaceous reducing agent required for reduction separately from the solid reduced iron A, but the carbonaceous reducing agent charged additionally is essentially supplied to the periphery of the solid reduced iron A, and does not intrude to the inside of the solid reduced iron A, so that unless the solid reduced iron A is melted, the reducing force cannot be obtained effectively, and the reducing rate in the solid reduced iron A depends on the amount of the carbonaceous reducing agent that is present in the solid reduced iron A.

From the viewpoint described above, as a result of the study on the amount of the carbonaceous reducing agent contained in the solid reduced iron A as other factors for efficiently proceeding the heat reduction of the solid reduced iron A charged in the melting furnace 3 in a short period of time, it has been found that reduction for the iron oxide in the solid reduced iron A proceeds rapidly by undergoing the heat from the outside to attain a high efficiency for the reduction and melting, if the carbon content in the solid reduced iron A is defined as 50% or greater, more preferably, 70% or greater relative to the theoretical equivalent amount required for reducing iron oxides remaining in the solid reduced iron A.

It is optional to define the carbon content as 100% or greater. However, it has been confirmed that practical problems scarcely occur if there is insufficiency for about 50% in the carbon content, since iron oxide in the unreduced state flowing out by the melting of the solid reduced iron A is rapidly reduced by additionally charging the carbonaceous reducing agent separately for the insufficiency of the carbon component. Accordingly, if the carbon content in the solid reduced iron A supplied to the arc heating type melting furnace 3 is less than 100% for the theoretical equivalent component required for the reduction of iron oxide remaining in an unreduced state, the carbon content for insufficiency may be charged additionally as the carbonaceous reducing agent separately in the vicinity of the charging portion for the solid reduced iron A.

Since the specific gravity of the solid reduced iron manufactured by the reduced iron production facility varies depending on the property and the blending ratio of the raw material supplied to the reduced iron production facility, and reduction conditions in the reduced iron production facility (particularly atmospheric temperature or time), a relation between the conditions and the specific gravity is previously confirmed by the preliminary experiment and the appropriate conditions may be set in accordance therewith.

Further, the residual amount of carbon in the solid reduced iron may be adjusted by completely recognizing the reducing characteristics in the reduced iron production facility, determining the blending amount while considering the reducing reaction characteristics thereof based on the kinds and the compositions of the blending materials and properly controlling the conditions for reduction (temperature, time, atmospheric gas composition).

Then, the reason for adjusting the carbon content in the molten iron A obtained by the arc heating type melting furnace 3 within the range from 1.5 to 4.5% is to be explained.

In the case of reduced iron manufactured from the iron oxide containing shaped products incorporated with the carbonaceous reducing agent, about 70% of the sulfur content contained in the carbonaceous reducing agent such as coal usually remains in the reduced iron. Then, when the reduced iron is melted in the melting furnace, particularly, when the reduced iron of low metallization is melted, desulfurization in the melting furnace is scarcely expected, so that most of the sulfur carried in the melting furnace transfers into the molten iron to produce molten iron of high S content.

The sulfur content in the molten iron can be desulfurized after tapping from the melting furnace in a ladle mainly by using a calcareous flux. However, if the carbon content (C) in the molten iron is less than 1.5% since the level of the oxygen content (O) present in an equilibrium state in the molten iron is increased, subsequent desulfurizing efficiency is remarkably hindered. Accordingly, in order to increase the desulfurizing efficiency and facilitate the production of molten iron of low S content, it is necessary to increase (C) in the molten iron produced by the arc heating type melting furnace 3 to 1.5% or higher. However, (C) in the molten iron is substantially saturated around 4.5% and, for stably obtaining the molten iron with saturated (C), it is necessary to charge a considerably excess amount of the carbonaceous reducing agent into the melting furnace, so that the carbonaceous reducing agent is always present by about 10% or higher in the slag of the furnace, which increases the cost required for the carbonaceous reducing agent and this also increases decarbonization load in the subsequent melting, which is not desirable. For increasing the operation stability, a particularly preferred lower limit for the carbon content in the molten iron is 2.0%, while a preferred upper limit thereof is 3.5%.

There is no particular restriction on the concrete method for controlling the amount of carbon in the molten iron produced by the arc heating type melting furnace 3 to a range from 1.5 to 4.5% described above. It is possible to previously determine the optimal condition for ensuring the carbon amount by a preliminary experiment (the amount of the carbon material incorporated upon manufacturing shaped products, preliminary reduction condition in the reduced iron production facility, additional charging amount of the carbonaceous reducing agent and operation conditions in the arc heating type melting furnace), and to conduct the operation under the thus determined conditions. However, the quality of the iron oxide source and the carbonaceous reducing agent as the raw material for the shaped products is not always stable but usually fluctuates considerably, so that it is desired to adopt, for example, the following methods in order to obtain molten iron of a stable carbon content in the appropriate range irrespective of such fluctuating factors.

1. A method of sampling molten iron in the arc heating type melting furnace, controlling the addition amount of the carbonaceous reducing agent while analyzing the molten iron and actually measuring the amount of carbon in the molten iron.

2. A method of measuring the composition and the amount of exhaust gases exhausted from the arc heating type melting furnace, determining the carbon content in the molten iron based on the oxygen equivalent amount in the exhaust gases calculated based on the measured value by calculation and controlling the amount of the carbonaceous reducing agent to be charged additionally in accordance with the carbon content.

By the way, when the solid reduced iron is reduced and melted simultaneously in the arc heating type melting furnace, molten slags formed from the gangue compounds in the solid reduced iron float on the molten iron. It is extremely effective practically to appropriately control the basicity and the iron oxide content of the molten slag for increasing the reduction efficiency and the separation efficiency of the molten slags in the melting furnace or suppress the erosion of lined refractories in the melting furnace. Upon practicing the present invention, it is desirable that the basicity of the molten slag is controlled within a range from 1.0 to 1.8 (more preferred lower limit is 1.1 and more preferred upper limit is 1.5), and the total iron content (T.Fe), (the total amount of iron content present as the iron oxide) in the molten slag is controlled to 9% or lower, more preferably, 5% or lower.

The slag basicity is one of fundamental and typical characteristics characterizing the slag properties, which is represented by the ratio of CaO and $SiO_2$ as typical ingredients contained in the molten slag, namely, $(CaO)/(SiO_2)$. If the basicity of the molten slag exceeds 1.8, the melting point of the slags rises abruptly to lower the fluidity and smooth preceding of the reduction and the melting in the melting furnace are difficult unless the temperature for the molten iron is intentionally elevated. Further, if the basicity is less than 1.0, erosion for the lined refractories becomes large. Further, the erosion of the lined refractories in the melting furnace becomes larger as the amount of the iron oxide is increased in the molten slag. Such a trend develops conspicuously if (T.Fe) of the molten slag exceeds 9%. Accordingly, in order to efficiently proceed the reduction and melting for the solid reduced iron in the melting furnace in a short period of time and to extend the working life of the melting furnace by minimizing the erosion of the lined refractories in the melting furnace, it is desirable for sampling molten slags properly in the reducing melting step of the solid reduced iron in the arc heating type melting furnace, measuring the basicity and the (T.Fe) amount, properly controlling the slag basicity in a proper range by adding the slag basicity adjusting agents (CaO or $SiO_2$), or controlling the amount of additional carbonaceous reducing agent to suppress the amount of (T.Fe) in the molten slag.

By reducing and melting in the arc heating type melting furnace 3 as described above, a molten iron with the carbon content of 1.5 to 4.5% and Si content of about 0.05% or less can be obtained. Although somewhat different depending on (C) in the molten iron, the molten iron can be supplied in the molten state as it is while possessing the heat of about 1350° C. or higher to a steel making furnace such as an EAF or a BOF, or can be taken out once into a mold and cooled to solidify and then utilized as an intermediate product for steel making as explained with reference to FIG. 1. However, since much of sulfur and phosphorus are contained in the molten iron obtained as above, it is desirable that such sulfur and phosphorus are previously eliminated before delivery to the steel making step.

As a preferred desulfurizing method adapted for this purpose, there can be mentioned, for example, a method of tapping the molten iron produced in the melting furnace 3 into a ladle or the like, adding a calcareous flux thereto for desulfurization, preferably injecting the calcareous flux together with an inert gas into the molten iron using a blowing lance immersed capturing sulfur by the flux and then separating and removing as slags on the molten iron. Further, as preferred dephosphorization method, there can be mentioned, for example, a method of supplying a solid oxygen source (iron oxide or the like) or a gaseous oxygen source (oxygen, air or the like) together with a calcareous flux to the molten iron tapped in a ladle or the like, preferentially oxidizing the phosphorus component, capturing the same with the flux and then floating to separate on the molten iron. There are no particular restriction to the desulfurization and dephosphorization method described above but it is of course possible to adopt other known desulfurization and dephosphorization methods. However, use of the latter dephosphorization method is preferred since (Si) in the molten iron produced in the melting furnace is as low as 0.05% or lower as described above, different from known blast pig iron, and high dephosphorization rate can be ensured with no particular desiliconization.

Conduction of the desulfurization and dephosphorization described above can provide a molten iron at high purity comprising 1.5 to 4.5% of (C), about 0.05% or less of (Si), about 0.1% or less of (Mn), about 0.05% or less of (S), about 0.04% or less of (P) and the substantial balance of Fe, which can be utilized extremely effectively as the raw material for steel making. Particularly, since the molten iron obtained by this method has a high iron purity with extremely less content of other impurity metal components, if this is used as the steel making material, for example, by about 20 to 50% together with other iron source (scrap or pig iron), it functions as a diluent for the impurity metal components intruded from scraps to obtain steels with less content of the impurity metal components. Of course, the ratio of the reduced iron to be used in combination can be selected out of the range described above depending on the content of the impurity metal components in the scraps to be used together, or the reduced iron can be used by 100% for effectively producing steels at high iron purity and, further, other metal components are positively added at the final stage of the steel making step using the EAF or BOF to produce alloy steels.

Any way, since the reduced iron obtained by the method according to the present invention has a remarkable feature that the content of the impurity metal is extremely small, this can be used generally in the production of steels of various kinds of alloy steels by taking advantages of such features.

Then, description will be made more specifically on the base for determining "metallization of solid reduced iron: 60% or higher", "carbon content in the solid reduced iron: 50% or more of the theoretical equivalent amount required for reducing the iron oxide remained in the solid reduced iron (hereinafter sometimes referred to as the carbon amount for the FeO reducing equivalent amount)", "specific gravity of solid reduced iron: 1.7 or higher" and "carbon content in the molten iron produced in the arc heating type melting furnace: 1.5%–4.5% respectively.

Base for determining "metallization of solid reduced iron: 60% of higher"

The curve for the metallization of solid reduced iron manufactured in the reduced iron production facility naturally varies depending on the composition and the blending ratio of the iron oxide raw material and the carbonaceous reducing agent to be blended and, further, the reducing conditions. The curve for the metallization exhibits a trend, for example, as shown in FIG. 3.

In the curve ① of FIG. 3, point A shows a point for metallization of 76% and residual carbon amount of 4.8% and the point B shows a point for the metallization of 85% and the residual carbon amount of 1.6%. The residual carbon amount is 142% at the point A and 63.5% at the point B relative to the carbon amount of FeO reducing equivalent amount, and the residual carbon amount decreases with lapse of the reducing time. The curve ② in FIG. 3 is an example of restricting the metallization of the solid reduced iron lower by varying the blending ratio of the raw materials. In any case, the metallization rises abruptly at first along with the proceeding of the reducing time, and a rising curve is moderated as the metallization is increased with elapse of time.

Figure 4:
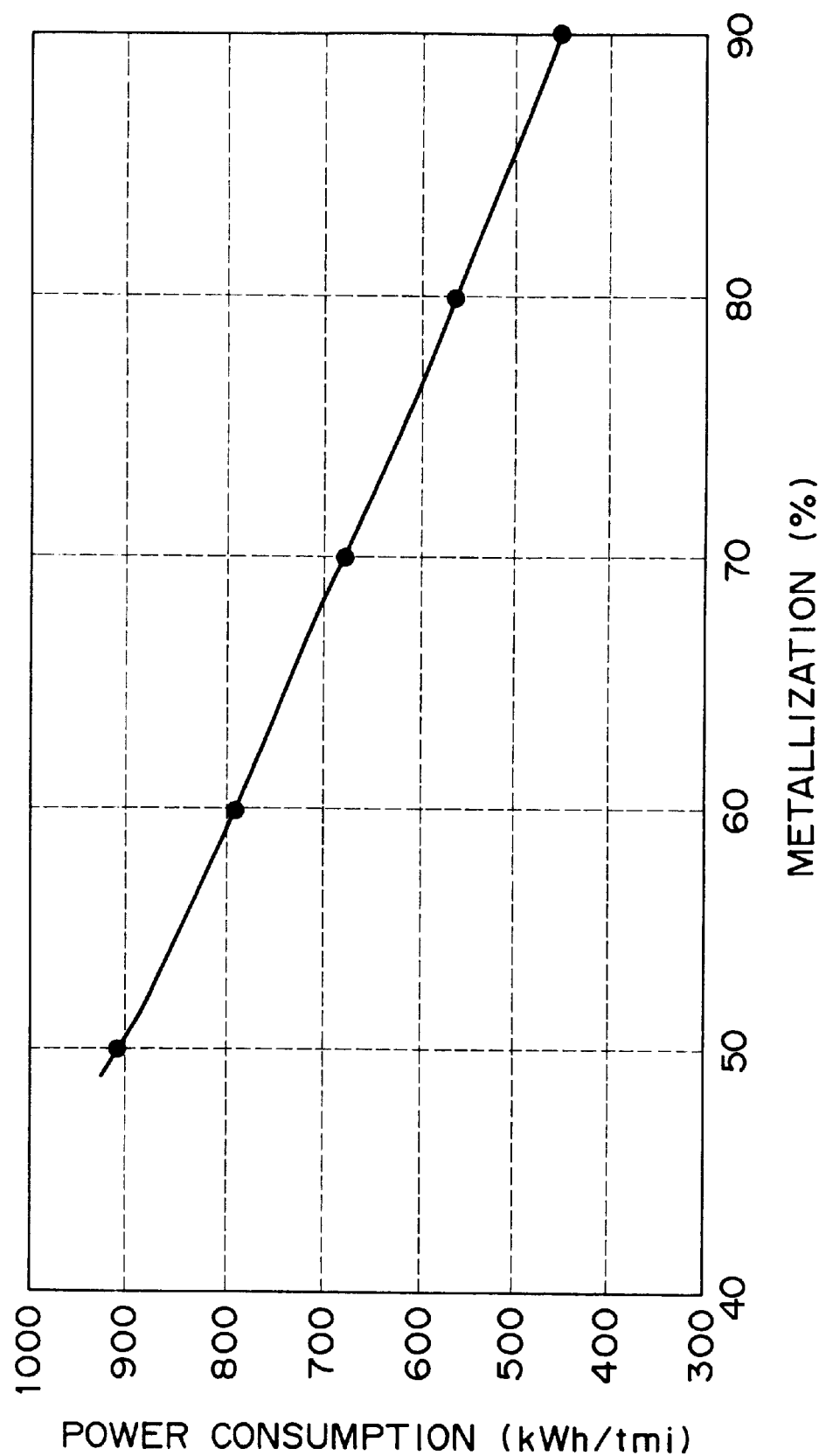
FIG. 4 is a graph illustrating an example of the relation between the reduction rate and the power consumption in the arc melting furnace of the solid reduced iron.

By the way, in the continuous process for the manufacture of the solid reduced iron and its reduction melting adopted in the present invention, the metallization for the solid reduced iron manufactured in the reduced iron production facility gives a remarkable effect on the operability of the arc heating type melting furnace (hereinafter referred to as an arc melting furnace). For example, FIG. 4 is a graph illustrating a relationship between the metallization of the solid reduced iron and a power consumption in the reduction melting of iron oxide in the art melting furnace. Upon conducting the continuous operation for the reduced iron production facility and the arc melting furnace, it is important to ensure the stable operation for the arc melting furnace. As the electric power supplied to the art melting furnace is increased, heat supply load by the electrode is necessarily increased to increase the thermal shocks given on the lined refractories of the melting furnace. Therefore, the size of the furnace body has to be enlarged in order to moderate thermal shocks on the electrode device and the furnace wall, which is poor in both practical and economical points of view.

In the usual arc melting furnace, such a problem appears conspicuously when the power consumption exceeds 800 kWh/tmi. Accordingly, in order to avoid the problem described above, the metallization of the solid reduced iron supplied to the arc melting furnace is controlled to 60% or higher, more preferably, 70% or higher.

Figure 5:
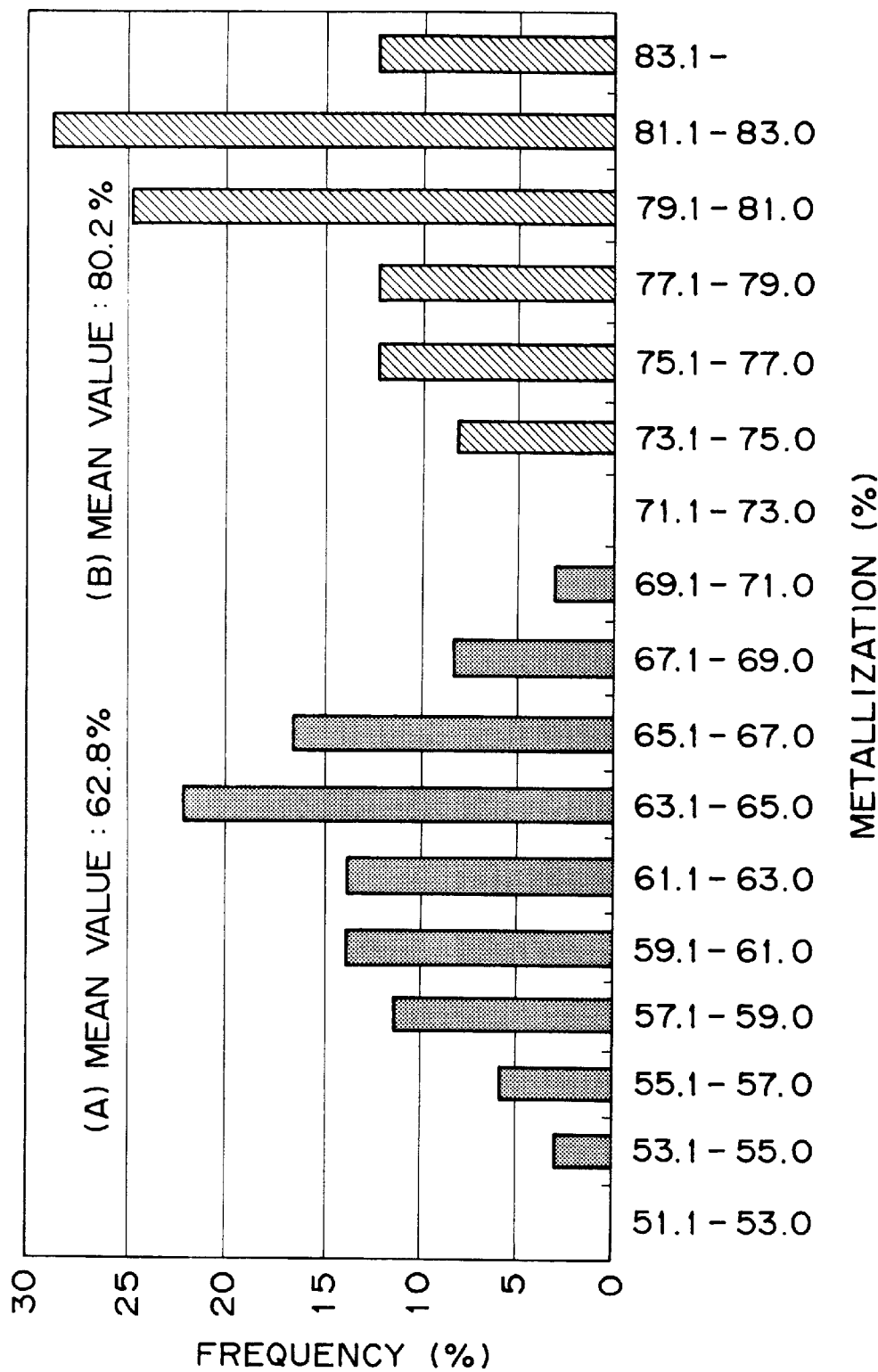
FIG. 5 is a graph illustrating an example of the metallization and scattering thereof of solid reduced iron.

Further, scatterings of the metallization of the solid reduced iron manufactured in the reduced iron production facility greatly suffers from the effect by an absolute value of the metallization and the scatterings is increased as the metallization is lowered. By the way, FIG. 5 is a graph illustrating a result of examining scatterings of the metallization for the solid reduced iron with the mean value for the metallization of 62.8% and the 80.2%. It can be confirmed that the scattering is remarkable as the metallization is lowered. In the actual operation, since the aimed metallization itself is made unstable as the scattering of the metallization is increased, it is necessary to set the metallization higher in order to ensure a stable aimed metallization. As a result of various experiments, it has been confirmed that the mean value of the metallization should be 60% or higher and more preferably, 70% or higher in order to restrict the scatterings in the metallization within a level capable of actual operation.

Base for determining "carbon content in the solid reduced iron: 50% or more of carbon amount for FeO reducing equivalent amount"

Figure 6:
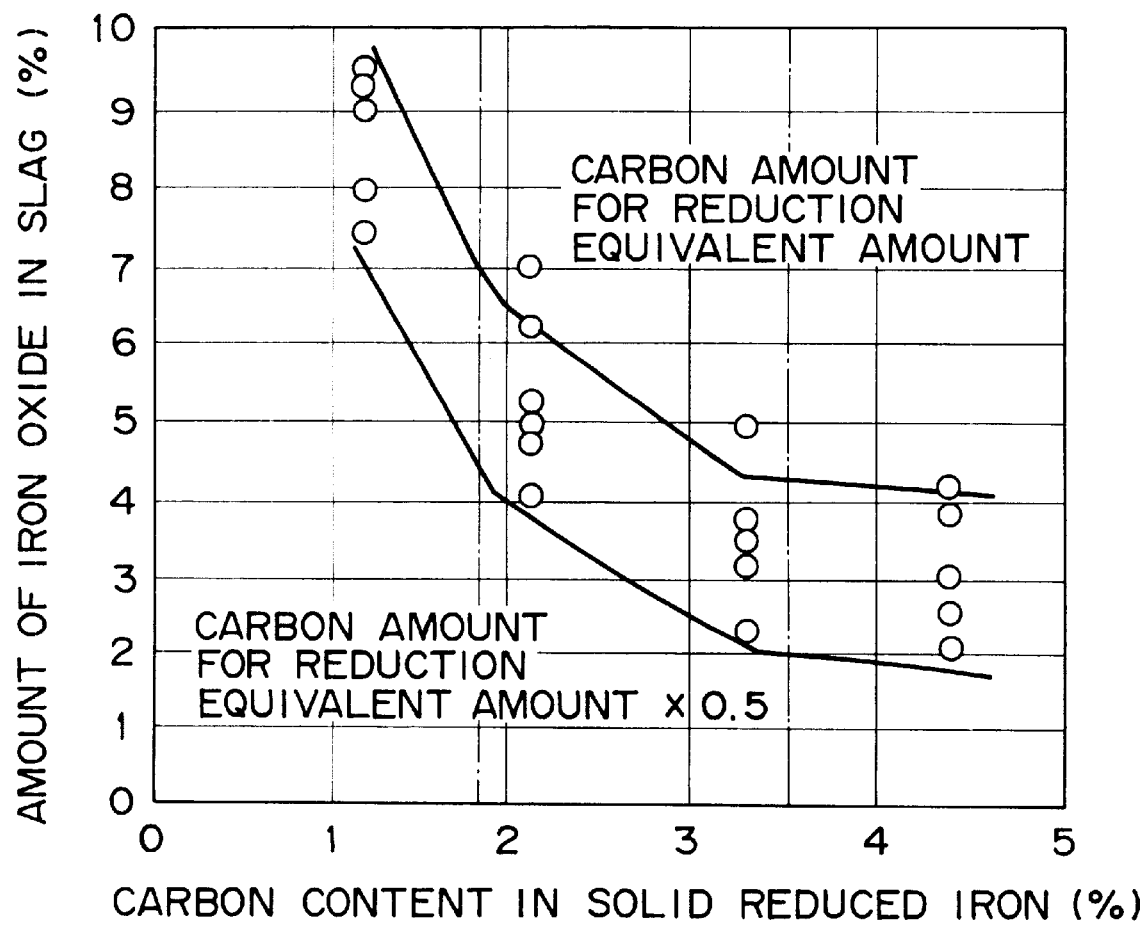
FIG. 6 is a graph illustrating the relation between a carbon content in the solid reduced iron and an iron oxide (T.Fe) in molten slag.

FIG. 6 is a graph showing a result examining a relation between the carbon amount for FeO reducing equivalent amount in the solid reduced iron and the iron oxide content in the molten slag, regarding solid reduced iron manufactured under various conditions. In this experiment, solid reduced iron having the metallization from 78 to 82% and having different carbon amount of FeO reducing equivalent amount are used and the content of iron oxide (T.Fe) in the molten slag when melted by using a 20 ton EAF. As apparent also from the figure, it can be confirmed that when the carbon amount for FeO reducing equivalent amount (theoretical equivalent amount of carbon required for reducing unreduced iron oxide) is contained in the solid reduced iron, (T.Fe) in the molten slag is restricted to a low level, whereas the carbon content is less than 50% of the carbon amount for FeO reducing equivalent amount (carbon amount for FeO reducing equivalent amount×0.5), (T.Fe) in the molten slag is increased abruptly and, thus, the erosion of the lined refractories is remarkable. Accordingly, for minimizing the erosion of the lined refractories to ensure stable operation, the carbon content in the solid reduced iron should be 50% or more of the carbon amount for FeO reducing equivalent amount.

In this experiment, for controlling the carbon content in the molten iron produced in the arc melting furnace within a range from 2.1 to 2.4, carbon material for making up the insufficiency is additionally charged in the arc melting furnace but (T.Fe) in the molten slag can not be reduced sufficiently unless the residual carbon amount in the solid reduced iron itself is made to 50% or higher of the carbon amount for FeO reducing equivalent amount substantially irrespective of the such amount of additional carbon material. It may be considered of course possible to reduce (T.Fe) in the molten slag by additionally charging the carbon material in an amount sufficient to ensure the carbon content of reducing the equivalent amount and the aimed carbon content in the reduced molten iron to the iron oxide remaining in the solid reduced iron. However, it is extremely difficult actually to maintain the carbon content in the molten iron at a constant value less than the saturation carbon amount but the carbon content in the molten iron is increased gradually with the lapse of the precessing time, failing to obtain molten iron of an aimed carbon content, which is undesirable.

Base for determining "Specific gravity of solid reduced iron: 1.7 or higher"

In a case of adopting the method of the present invention for obtaining solid reduced iron by preliminary reduction of the iron oxide shaped product incorporated with the carbon material in a solid state, since cavities are formed at the inside in each of the shaped products by so much as the carbon material and the like are blended along with preceding of preliminary reduction, the specific gravity of the solid reduced iron is considerably lower compared with that of the preliminary reduced iron produced, for example, by a MIDREX process.

Figure 7:
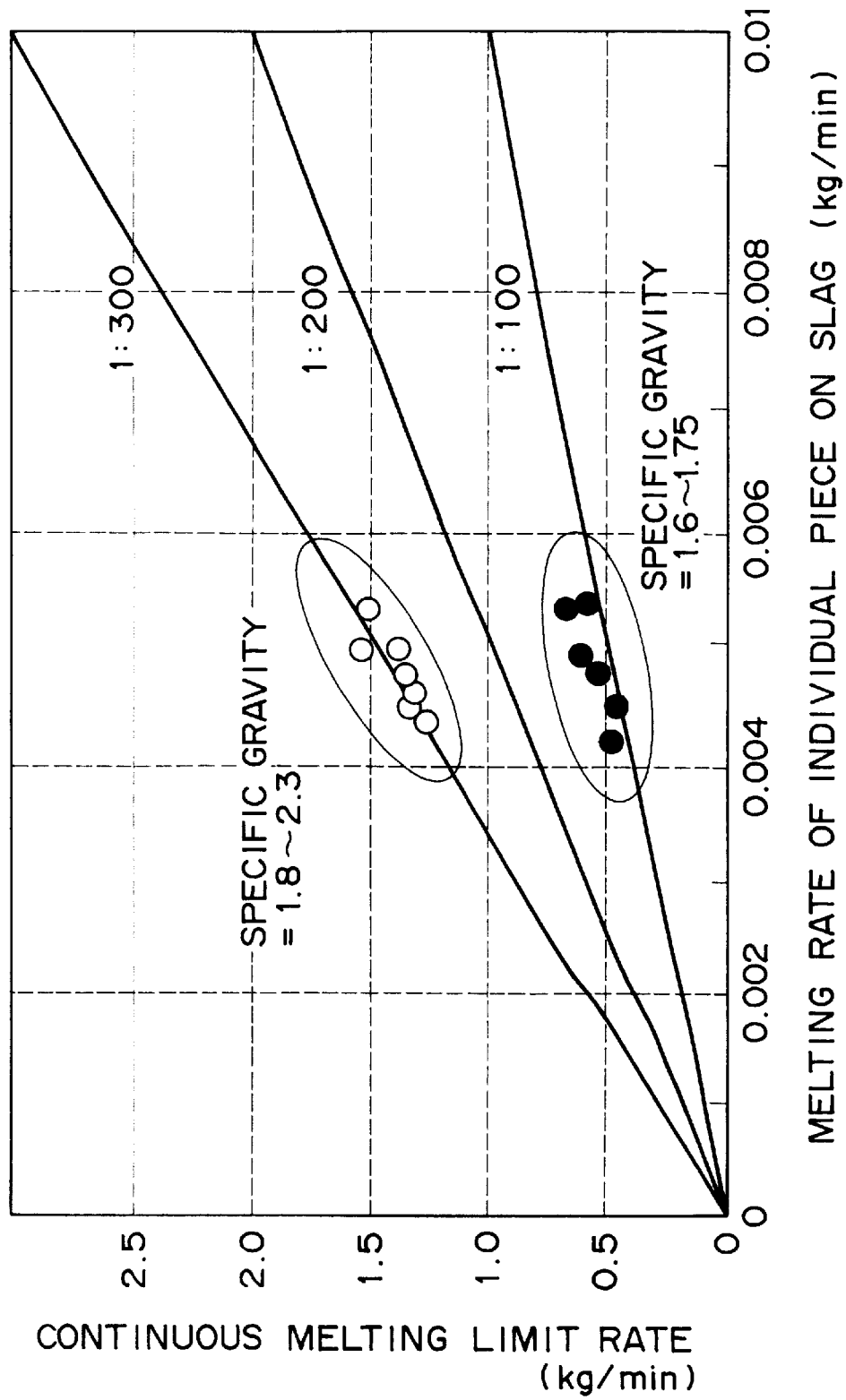
FIG. 7 is a graph illustrating the relation between the melting rate of individual solid reduced iron piece and the limit melting rate upon continuous charging.

On the other hand, as explained for FIG. 2, in order to increase the efficiency for reduction melting of the solid reduced iron upon reduction and melting of the solid reduced iron in the arc melting furnace, it should be adapted such that the solid reduced iron charged in the arc melting furnace rapidly sinks into the molten slag on the molten iron and efficiently receives the heat of arcs on the entire surface. For this purpose, the specific gravity of the solid reduced iron has a large effect. By the way, FIG. 7 is a graph showing a result examining the effect of the specific gravity of the solid reduced iron on the reduction and melting rate upon conducting reduction and melting in the arc melting furnace by using solid reduced iron having a specific gravity from 1.60 to 1.75 (mean specific gravity: 1.65) and from 1.8 to 2.3 (mean specific gravity: 2.1) in which the abscissa represents the melting rate when each of solid reduced iron is charged alone on the molten slag and the ordinate represents the limit melting rate at which each of solid reducing iron can be charged continuously for reduction melting.

As apparent from the figure, in a case of the solid reduced iron at the mean specific gravity of 1.65, if the solid reduced iron is charged continuously on the molten slag, a phenomenon that the solid reduced iron submerges into the molten slag is not observed but most of solid reduced iron undergoes reduction melting on the surface of the molten slag. Accordingly, the melting rate when the solid reduced iron is discharged continuously is about 100 times of the melting rate when the solid reduced iron is charged alone. With the melting rate at that level, reduction and melting by the continuous charging can not be practiced in a practical scale. On the contrary, for the solid reduced iron with a mean specific gravity of 2.1, solid reduced iron charged on the molten slag rapidly submerges into the slag and the reduction melting proceeds efficiently, so that the melting speed when the solid reduced iron is charged continuously is increased greatly compared with a case of charging alone, and a continuous melting rate at about 300 times can be obtained. With the melting rate at this level, continuous reduction melting can be put to practical use effectively in an industrial scale.

Referring to the effect of the specific gravity of the solid reduced iron, the situation of melting changes greatly for the mean specific gravity of 1.7 as a boundary at which the continuous melting rate changes abruptly. Then, if the mean specific gravity is less than 1.7, no melting rate capable of satisfying the continuous operation in an industrial scale can be obtained and a melting rate sufficient to conduct the continuous operation can be ensured when the mean specific gravity is 1.7 or higher more preferably 1.9 or higher.

Base for determining "carbon content in the molten iron produced in arc heating type melting furnace: 1.5%–4.5%"

Generally, there is a close relation between the amount of carbon and the dissolved amount of oxygen in molten iron in which the dissolved oxygen amount increases in the molten iron as the carbon content in the molten iron decreases. Then, as the amount of the dissolved oxygen is greater, the oxygen potential of the molten iron is higher, which is disadvantageous for desulfurization. Along with this, the oxygen potential of the molten slag balanced with the molten iron is also higher and, thus, FeO content in the molten slag is increased to increase a reactivity with the refractories to make the erosion of the lined refractories of the melting furnace large. Therefore, it is necessary to determine the carbon content in the molten iron to somewhat higher in order to increase the desulfurization ratio upon desulfurization and suppress the erosion of the lined refractories of the melting furnace to extend the working life.

Figure 8:
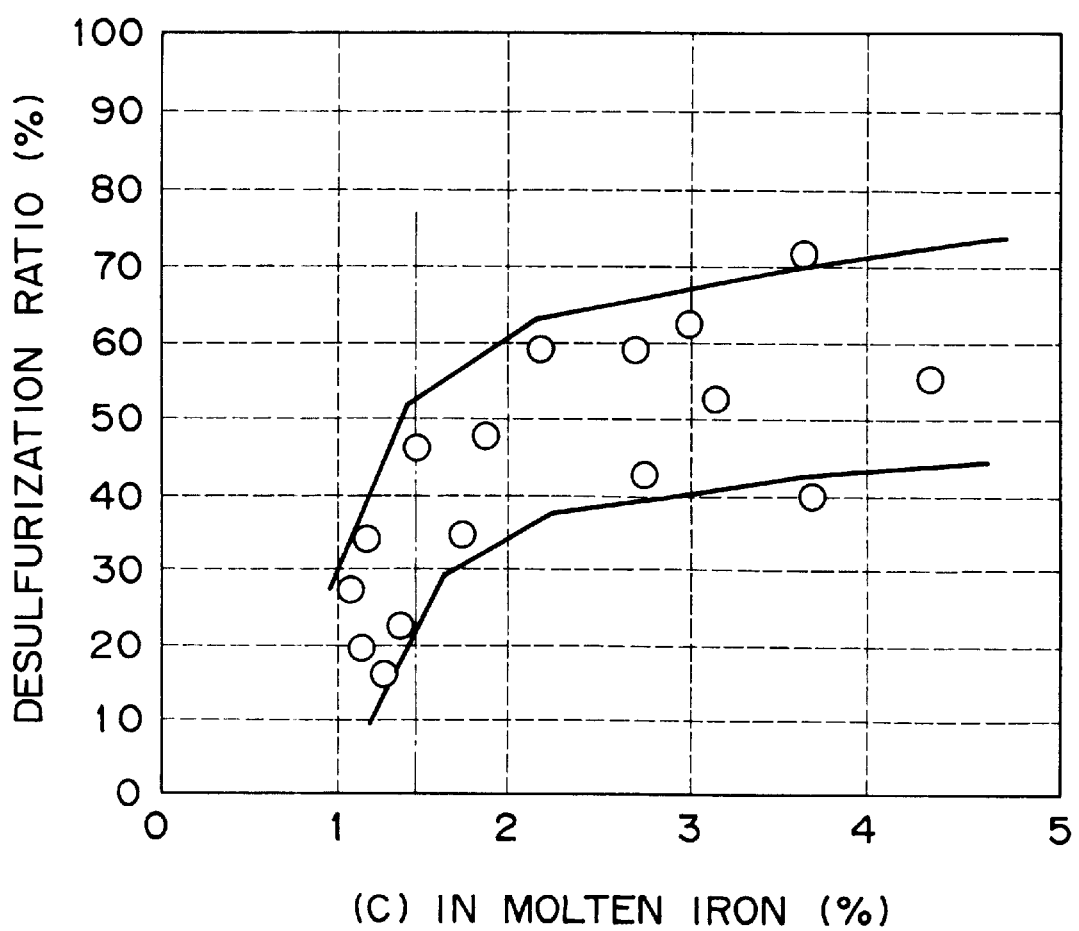
FIG. 8 is a graph illustrating the relation between the carbon content and desulfurizing ratio in molten iron.

By the way, FIG. 8 is a graph collectively illustrating relationships between the carbon content and the desulfurization ratio in the molten iron obtained by various experiments. In this experiment, a method of injecting CaO series desulfurizing agent to the molten iron in the ladle is adopted and data when the consumption of the desulfurizing agent is made constant are arranged. As apparent from the figure, if the carbon content in the molten iron is less than 1.5%, the desulfurization agents has to be injected in order to ensure the aimed desulfurization ratio and, as a result, a great amount of metallic iron is taken into the slag produced in a great amount to increase iron loss. That is, for enabling the present invention on a practical scale, it is necessary also to consider additional problems such as processing of slag caused by desulfurization and the carbon content in the molten iron, which should be 1.5% or higher, preferably, 2.0% or higher in order to sufficiently conduct desulfurization in the ladle with a smaller consumption of desulfurizer.

However, the carbon content in the molten iron reaches saturation at about 4.5% and an excess amount of carbonaceous reducing agent has to be used in order to obtain a molten iron with saturation carbon content which is not economical. In addition, since the deoxidizing load upon subsequent refining is also increased, the carbon content is desirably restricted to 4.5% or less, more preferably 3.5% or less.

"Basicity of molten slag: 1.0–1.8"

While this basicity ($CaO/SiO_2$ ratio) is not an essential condition in the present invention, it gives not a little effect on the efficiency of reduction melting of solid reduced iron in the arc melting furnace but also gives a significant effect on the erosion of the lined refractories of the melting furnace.

Figure 9:
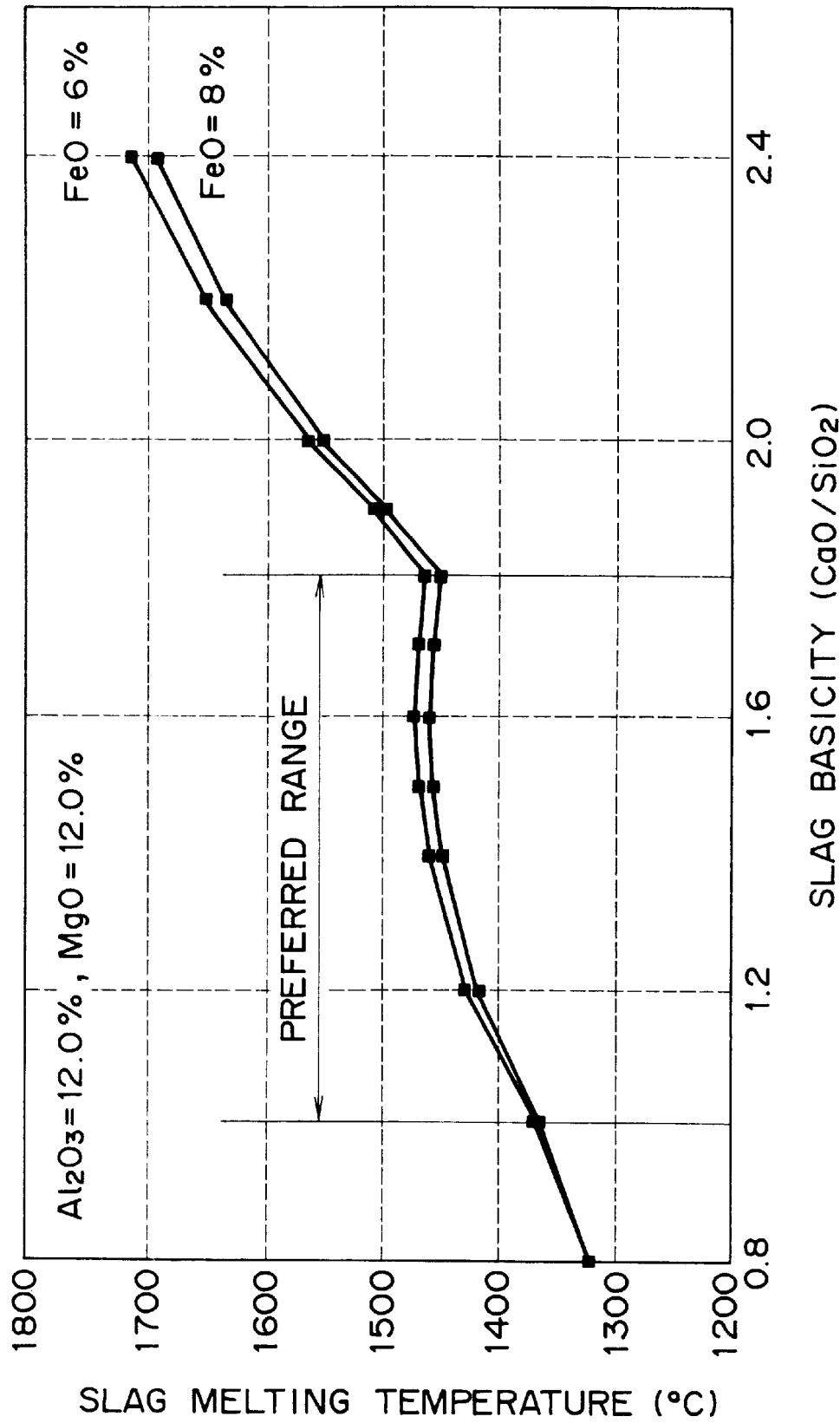
FIG. 9 is a graph illustrating the relation between the basicity and the melting temperature of the slag.

That is, the basicity of the molten slag gives a significant effect on the fluidity thereof and as shown in FIG. 9 for instance, the melting temperature of the slag is decreased to increase the fluidity as the basicity is decreased, to give a preferred effect on the reduction melting efficiency of the solid reduced iron, whereas reactivity with the refractory is increased to make the erosion of the lined refractories large. On the other hand, as the basicity is increased, the melting temperature of the slag rises and, accordingly, the temperature in the furnace has to be increased excessively in order to melt the slag to give a negative effect in view of heat energy and, in addition, thermal effects due to high temperature on the furnace body is also increased. Such a trend, as shown in FIG. 9, becomes conspicuous as the slag basicity is less than 1.0 or exceeds 1.8, so that the basicity of the molten slag in the arc melting furnace is desirably controlled within a range from 1.0 to 1.8, more preferably, 1.3 to 1.6.

Examples of the present invention are described below. The present invention is not restricted to the following examples but can be practiced with appropriate modifications so long as they are within the scope of the present invention and contained within the technical range of the present invention.

EXAMPLES

Each of pulverization products of iron ore, coal and small amount of binder (bentonite) are used and blended such that carbon in the coal is in a theoretical equivalent amount to iron oxide in the iron ore. They were shaped into a substantially spherical form of about 13 to 20 mm diameter in a pelletizing device and the iron oxide containing shaped products incorporated with carbon material were used as the green shaped products. An example of the composition for the iron ore and coal used is shown below.

Composition of Iron Ore:

T.Fe=65%, FeO=0.7%, $SiO_2$=2.5%

$Al_2O_3$=2.10%, CaO=0.04%

Composition for coal:

Total carbon amount=77.6%, fixed carbon=71.2% volatile component=17.0%, ash=11.8%

Figure 10:
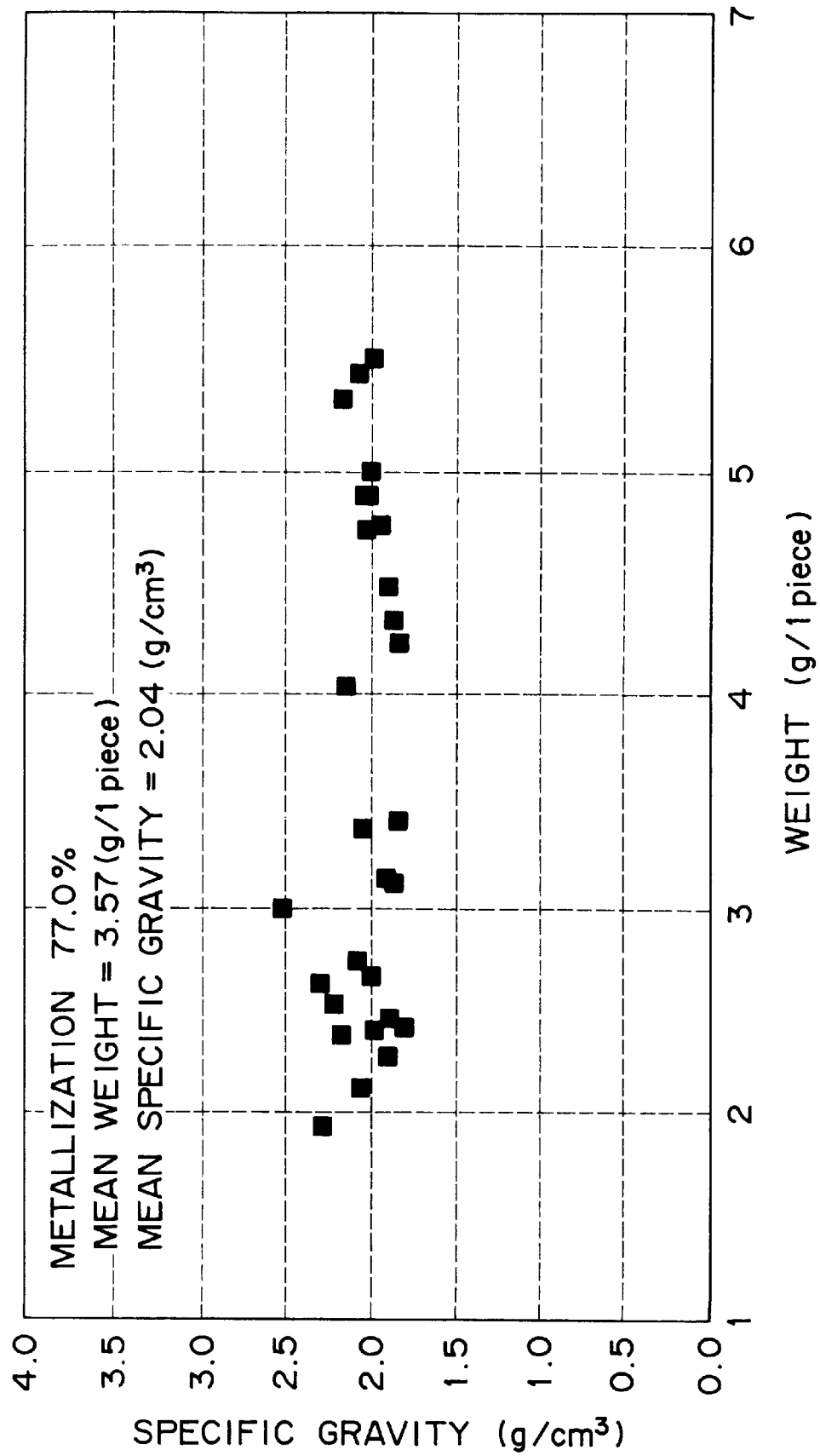
FIG. 10 is a graph illustrating the weight of individual solid reduced iron piece and the specific gravity of the solid reduced iron.

The shaped products (green pellet) were supplied to a reduced iron production facility of a rotary hearth type and reduction was conducted at a temperature of 1250 to 1350° C. for a mean staying time in the rotary furnace for 7 to 9 min to produce reduced iron. The amount of the unreduced iron oxide and the amount of residual carbon in the resultant solid reduced iron differ depending on the heat-reducing conditions. In this example, the heat-reducing conditions were controlled such that metallization for iron oxide in the solid reduced iron was 60% or more in each case. Table 1 shows an example for the metallization and the composition of the solid reduced iron. Further, the weight and the specific gravity of the solid reduced iron obtained by the similar experiment are, for example, as shown in FIG. 10 in which the mean specific gravity is contained within a range from 1.7 to 2.5 with not scarce relation to the weight per piece.

TABLE 1

| No. | Metallization | T.Fe | M.Fe | FeO | $C_{eq}$ | $C_{eq}/2$ |
|---|---|---|---|---|---|---|
| 1 | 92 | 85.1 | 78.3 | 8.9 | 1.5 | 0.7 |
| 2 | 90 | 84.4 | 76.0 | 11.0 | 1.8 | 0.9 |
| 3 | 80 | 80.8 | 64.7 | 21.1 | 3.5 | 1.8 |
| 4 | 70 | 77.5 | 54.3 | 30.3 | 5.1 | 2.5 |
| 5 | 60 | 74.5 | 44.7 | 38.8 | 6.5 | 3.2 |
| 6 | 50 | 71.7 | 35.9 | 46.7 | 7.8 | 3.9 |
| 7 | 40 | 69.1 | 27.6 | 54.0 | 9.0 | 4.5 |

(note) $C_{eq}$: amount of carbon for FeO reducing equivalent amount
$C_{eq}/2$: ½ amount corresponding to the amount of carbon for FeO reducing equivalent compound.

The solid reduced iron obtained by the reduced iron production facility was continuously charged in a state so as not to be in contact with atmospheric air as much as possible and kept at a high temperature (1000° C. in this experiment) into an arc heating melting furnace disposed in adjacent with the reduced iron production facility and put to further reduction and melting. In this case, a predetermined amount of molten iron was maintained in the melting furnace, the basicity of molten slag floating on the molten iron was adjusted to a range from 1.0 to 1.8, current was supplied in a state of immersing electrodes for arc heating into the molten slag and an immersed arc heating system was employed. Then, the solid reduced iron was charged to the vicinity of the arc heating portion, coal was additionally charged to the position for charging the solid reduced iron, and reduction melting by arc heating were preceded.

The solid reduced iron in the reduction melting step contains more $SiO_2$ than other oxides as the slag-forming agents. As the basicity, lowered along with the preceding of the melting of the reduced iron in the melting furnace, a flux mainly comprising a calcined lime and, optionally, calcined dolomite was added as the basicity adjusting agent to control the basicity of the molten slag to a range from 1.0 to 1.8. By the way, it has been confirmed that if the basicity of the molten slag exceeded 1.8 as described above, the molten slag becomes viscous and the solid reduced iron sank less into the molten slag to lower the heat reduction efficiency and, on the other hand, if the basicity was less than 1.0, erosion of the lined refractories became conspicuous.

In the heat-reduction melting step, the solid reduced iron charged on the molten slag received heat of arcs while being in contact with the molten slag, in which reduction for the reduced iron oxide preceded by the carbon content remaining in the inside, CO gas was released to the surface of the solid reduced iron and the solid reduced iron vigorously moved around and the molten slag bellow violently by the CO gas. Then, the solid reduced iron sunk into the molten slag as the lowering of the specific gravity caused by the blowing and further decreased heat reduction, by which the unreduced iron was reduced substantially and melted under the effect of the carbonaceous reducing agent discharged additionally to the periphery thereof and then incorporated into the lower molten iron.

In this case, the charged solid reduced iron after charged from above the molten slag sank rapidly into the molten slag and the heat-reduction efficiently preceded in a short period of time if the specific gravity of the solid reduced iron to be charged was 1.7 or greater, preferably, 1.8 or greater and, further preferably, 1.9 or greater, whereas the charged solid reduced iron less sand into the molten slag if the specific gravity was less than 1.7 so that heat conduction from the molten slag is insufficient and blowing was decreased to make a remarkable delay in the time required for heating-reduction and corresponding thereto, the melting amount of iron oxide into the molten slag was also increased tending to cause erosion of lined refractories of the melting furnace.

Further, also in a case if the carbon content in the solid reduced iron was less than 50% for the theoretical amount of carbon required for reducing the unreduced iron oxide in the solid reduced iron, the reducing efficiency was insufficient and the reducing rate was slow even when the carbonaceous reducing agent was charged additionally into the melting furnace, and the content of the iron oxide in the molten slag was increased to remarkably cause erosion of the lines refractories.

Further, in the heat-reduction step, the molten iron was periodically sampled to measure the amount of carbon, and the amount of additionally charged carbonaceous reducing agent was controlled such that the amount of carbon was within a range from 1.5 to 4.5%.

The heat-reduction melting step was conducted continuously and, at the instance a predetermined amount of molten iron stagnated in the melting furnace, molten iron was discharged from tapping port, arranged to the bottom of the furnace to a ladle and, at the same time, an appropriate amount of molten slag was discharged through a slag discharge port arranged on the side wall of the melting furnace to control the amount of slag remaining in the furnace.

Concrete conditions for conducting such heat-reduction melting and results thereof are exemplified as below:

(Property of the Reduced Iron)

Composition for solid reduced iron etc.: No. 3 (metallization: 80%) in Table 1

Charging temperature to the arc heating type melting furnace: 1000° C.

Charging method: Continuous charging (Operation Condition of Art Heating Type Melting Furnace)

Power consumption to the arc heating electrode:
about 565 KWh/tmi (mi: molten iron to be produced)

(Kind and the amount of charging material)

Calcined lime: 92.2 kg/tmi, calcined dolomite: 21.5 kg/tmi

Additional charging amount of coal: about 20 kg/tmi

Unit consumption of reduced iron: 1227 kg/tmi (Composition for the Molten Iron and Slag Formed to be Obtained)

Molten iron:
C: 2.0%, Si: 0.03% or less, Mn: 0.05% or less,
P: 0.043%, S: 0.137%, Temperature 1550° C.

Slag formed:
CaO: 36.5%, $SiO_2$: 26.1%, $Al_2O_3$: 18.2%, MgO: 10.0%
T.Fe: 6.3%, Basicity: 1.4

As apparent from the foregoing, the Si content of the molten iron was lowered sufficiently in the reducing melting step, since the S content and the P content are too high as the raw material for steel making, desulfurization and dephosphorization were conducted in a ladle to obtain the molten iron of the following composition.

Material for desulfurization: calcareous flux
Compositions: CaO; 83–90%, $CaF_2$: 6–10%, C: 4.0%
Consumption: about 12 kg/tmi Material for desulfurization: calcareous flux+$Fe_2O_3$
Compositions: CaO; 44–45%, $CaF_2$: 7–8%, $Fe_2O_3$: 47–48%
Consumption: about 20 kg/tmi Compositions of molten iron after desulfurization and dephosphorization
C: 1.8–2.0%, Si: trace, Mn: 0.02%, P: 0.032%, S: 0.038%

Molten iron (1450° C.) after the desulfurization and dephosphorization were charged together with iron scraps and pig iron with the following blend into an EAF and electric furnace steel making was conducted while adding the following sub-materials and blowing a small amount of oxygen to produce molten steel of the following composition.

(Material Charged in Electric Arc Furnace)
Desulfurized and dephosphorized molten iron: 40%, scrap: 50%, pig iron: 10%

(Sub-material)
Calcined lime: 50.2 kg/tmi, calcined dolomite: 10 kg/tmi
Silicic stone: 15.1 kg/tmi
Blowing amount of oxygen: about 18 $Nm^3$/tmi (Composition of Molten Steel Obtained)
C: 0.10%, Mn: 0.06%, Si: trace, S: 0.022%, P: 0.018%

The foregoing experiments show examples of supplying molten iron, prepared in the arc heating type melting furnace and put to desulfurization and dephosphorization, into the EAF as it is in the molten state, namely, in a state of being kept at a high temperature and using as the iron making material, but the molten iron can be supplied also to the BOF as a steel making material and, the molten iron can be once taken out into a casting mold and cooled to solidify and effectively utilized as intermediate material for steel making.

The present invention has been constituted as described above, which is capable of keeping a high reducing efficiency stably, capable of minimizing the erosion of lined refractories of the processing furnace to extend the working life of the furnace and, along with the effects described above, capable of efficiently attaining the production of reduced iron using, as the main material, the oxide-containing shaped product incorporated with the carbonaceous reducing agent and production of molten iron at high purity by further reduction and melting of the solid reduced iron obtained, in an industrial scale with small energy loss. Further, since the reduced iron obtained by this method has less content of impurity metal components, use of the reduced iron as the steel making material not only enables the production of steel materials at high purity, as well as facilitates the adjustment for the ingredients upon producing alloy steels. Further, when a steel making furnace is disposed in adjacent with the arc heating type melting furnace, and the molten iron produced by the melting furnace or molten desulfurized and dephosphorized iron thereof is supplied in a molten state possessing high heat to the steel making furnace as the steel making raw material, since the heat possessed in the molten iron can be utilized effectively as a heat source for steel making, the heat energy can be reduced further, and highly efficient method in view of practical use can be established as a through system from the production of reduced iron to steel making.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An iron making method for preparing a molten iron containing from 1.5 to 4.5% carbon, the method comprising:

(a) providing iron oxide and a carbonaceous reducing agent;

(b) preparing a shaped product from the carbonaceous reducing agent and the iron oxide;

(c) preparing solid reduced iron from the shaped product, wherein the solid reduced iron has a metallization of at least 60%, a specific gravity of at least 1.7, and a carbon content of at least 50% of the theoretical amount required for reducing the iron oxide remaining in the solid reduced iron; and (d) before substantial cooling occurs, heating the solid reduced iron after the solid reduced iron is submerged entirely in a foam of molten slag in an arc heating melting furnace, thereby preparing the molten iron containing from 1.5 to 4.5% carbon; wherein a basicity of the foam of molten slag is from 1.0 to 1.8.

2. The method of claim 1, further comprising controlling a carbon content of the molten iron by sampling the molten iron in the arc heating melting furnace;

analyzing the carbon content of the molten iron; and adding an amount of a carbonaceous reducing agent to the molten iron.

3. The method of claim 1, further comprising controlling a carbon content of the molten iron by measuring a composition and an amount of exhaust gases discharged from the arc heating melting furnace;

determining the carbon content of the molten iron based on an oxygen equivalent amount in the exhaust gases; and adding an amount of a carbonaceous reducing agent to the molten iron.

4. The method of claim 1, further comprising transferring the molten iron in the arc heating melting furnace to another container and then dephosphorizing the molten iron.

5. A steel making method comprising:

(a) providing iron oxide and a carbonaceous reducing agent;

(b) preparing a shaped product from the carbonaceous reducing agent and the iron oxide;

(c) preparing solid reduced iron from the shaped product, wherein the solid reduced iron has a metallization of at least 60%, a specific gravity of at least 1.7, and a carbon content of at least 50% of the theoretical amount required for reducing the iron oxide remaining in the solid reduced iron;

(d) before substantial cooling occurs, heating the solid reduced iron after the solid reduced iron is submerged entirely in a foam of molten slag in an arc heating melting furnace, thereby preparing molten iron containing from 1.5 to 4.5% carbon; and (e) adding the molten iron to a steel making furnace, thereby preparing steel; wherein a basicity of the foam of molten slag is from 1.0 to 1.8.

6. The steel making method of claim 6, wherein the steel making furnace is an electric arc furnace (EAF) or a basic oxygen furnace (BOF).

7. A steel making method comprising:

(a) providing iron oxide and a carbonaceous reducing agent;

(b) preparing a shaped product from the carbonaceous reducing agent and the iron oxide;

(c) preparing solid reduced iron from the shaped product, wherein the solid reduced iron has a metallization of at least 60%, a specific gravity of at least 1.7, and a carbon content of at least 50% of the theoretical amount required for reducing the iron oxide remaining in the solid reduced iron;

(d) before substantial cooling occurs, heating the solid reduced iron after the solid reduced iron is submerged entirely in a foam of molten slag in an arc heating melting furnace, thereby preparing molten iron containing from 1.5 to 4.5% carbon;

(e) cooling the molten iron, thereby preparing coagulated iron; and (f) adding the coagulated iron to a steel making furnace, thereby preparing steel.

8. The steel making method of claim 7, wherein the steel making furnace is an electric arc furnace (EAF) or a basic oxygen furnace (BOF).

9. An iron making method comprising:

(a) providing iron oxide and a carbonaceous reducing agent;

(b) preparing a shaped product from the carbonaceous reducing agent and the iron oxide;

(c) preparing solid reduced iron from the shaped product, wherein the solid reduced iron has a metallization of at least 60%, a specific gravity of at least 1.7, and a carbon content of at least 50% of the theoretical amount required for reducing the iron oxide remaining in the solid reduced iron; and (d) before substantial cooling occurs, heating the solid reduced iron after the solid reduced iron is submerged entirely in a foam of molten slag in an arc heating melting furnace to prepare a molten iron; wherein a basicity of the foam of molten slag is from 1.0 to 1.8.

10. The method of claim 9, further comprising adding a carbonaceous reducing agent to a charging position of the solid reduced iron in the arc heating melting furnace.

11. The method of claim 10, further comprising charging the solid reduced iron on the foam of molten slag in the arc heating melting furnace.

12. The method of claim 11, wherein the foam of molten slag contains 9% or less of iron oxide.

13. The method of claim 12, wherein the foam of molten slag contains 5% or less of iron oxide.

14. The method of claim 10, further comprising transferring the molten iron in the arc heating melting furnace to another container and then desulfurizing the molten iron.

15. The method of claim 10, wherein the molten iron contains 0.05% or less of Si.

16. The method of claim 10, wherein the molten iron contains 0.1% or less of Mn.

17. The method of claim 10, wherein the molten iron contains 0.1% or less of P.

18. The method of claim 10, wherein the molten iron contains 0.2% or less of S.

19. The method of claim 10, wherein only the solid reduced iron is melted in the arc heating melting furnace to prepare the molten iron.

* * * * *